United States Patent [19]

Boston

[11] Patent Number: 4,507,398

[45] Date of Patent: Mar. 26, 1985

[54] METAL PASSIVATION ADDITIVE

[75] Inventor: Ernest B. Boston, Phillips, Tex.

[73] Assignee: Phillips Petroleum Company, Bartlesville, Okla.

[21] Appl. No.: 637,360

[22] Filed: Aug. 3, 1984

Related U.S. Application Data

[62] Division of Ser. No. 599,840, Apr. 13, 1984.

[51] Int. Cl.$^3$ .................. C10G 11/05; C07F 9/90; B01J 23/18
[52] U.S. Cl. .................. 502/62; 502/31; 502/33; 502/60; 502/216; 208/52 CT; 208/113
[58] Field of Search .................. 502/60, 216, 31, 33, 502/62; 208/52 CT, 113, 120

[56] References Cited

U.S. PATENT DOCUMENTS

| | | | |
|---|---|---|---|
| 3,347,821 | 10/1967 | Malz et al. | 260/45.75 |
| 4,025,458 | 5/1977 | McKay | 252/416 |
| 4,031,002 | 6/1977 | McKay | 208/52 CT |
| 4,111,845 | 9/1978 | McKay | 208/52 CT |
| 4,190,552 | 2/1980 | Bertus et al. | 252/411 R |
| 4,193,891 | 3/1980 | McKay | 502/62 |
| 4,198,317 | 4/1980 | Bertus et al. | 502/62 |
| 4,207,204 | 6/1980 | McKay et al. | 502/62 |
| 4,209,453 | 6/1980 | Bertus et al. | 502/33 |
| 4,231,895 | 11/1980 | Dworkin | 252/400 A |
| 4,257,876 | 3/1981 | McKay | 208/52 CT |
| 4,263,130 | 9/1981 | Bertus et al. | 208/52 CT |
| 4,321,129 | 3/1982 | Bertus et al. | 208/120 |
| 4,396,496 | 8/1983 | Schare et al. | 208/120 |
| 4,404,089 | 9/1983 | Zrinscak | 208/120 |
| 4,459,366 | 7/1984 | Mark et al. | 208/52 CT |

OTHER PUBLICATIONS

"*Journal of Chemical Society*", vol. 121, pp. 2139–2146, (1922).

"*Helvetica Chemical Acta*", vol. 53, pp. 577–600, (1970).

*Primary Examiner*—Delbert E. Gantz
*Assistant Examiner*—Anthony McFarlane
*Attorney, Agent, or Firm*—L. M. Lavin

[57] ABSTRACT

A process for passivating metals in a cracking operation comprising treating the cracking catalyst with antimony tris(hydroxyhydrocarbylthiolate).

18 Claims, No Drawings

METAL PASSIVATION ADDITIVE

This is a divisional application of my co-pending Ser. No. 599,840, filed Apr. 13, 1984.

This invention relates to the cracking of hydrocarbons. In particular it relates to the treatment of cracking catalyst to passivate metal. It also relates to an additive useful in the passivation of metals in a catalytic cracking operation. It further relates to the preparation of a catalyst composition useful in the presence of metals in a catalytic cracking operation.

Hydrocarbon feed stock containing higher molecular weight hydrocarbons is cracked by contacting it at an elevated temperature with a cracking catalyst whereby distillates such as gasoline and higher boiling hydrocarbon fuels, for example kerosene, diesel fuel, burning oils and the like are produced. Cracking catalyst, when used to crack feedstock that contain metals, accumulates a deposit of these metals. These metals usually consist of vanadium, iron, and nickel. This accumulation decreases the yield of gasoline from the cracking operation and increases the yield of hydrogen and coke. Therefore, there is a need for a cracking process or a modified cracking catalyst which will prevent or reduce the deleterious effects of these metal contaminants.

Prior inventions have used antimony compounds to aid in the passivation of metals in these hydrocarbon feed streams. U.S. Pat. No. 4,321,129, incorporated by reference, shows the use of antimony and tin compounds. U.S. Pat. Nos. 4,025,458 and 4,190,552, also incorporated by reference, show antimony compounds alone, are useful for the passivation of metals. With the increased metal content of crude oils today, it is important that the passivation compounds be as inexpensive as possible in order to produce large volumes of gasoline and other higher boiling hydrocarbon fuels.

The object of this invention is to provide a passivation additive for metals deposited on cracking catalyst. Another object of this invention is to provide a metals passivation agent for hydrocarbon feed streams. A further object of this invention is to provide an inexpensive metals passivation agent for use in hydrocarbon cracking operations.

SUMMARY OF THE INVENTION

In accordance with the instant invention, antimony hydroxyhydrocarbylthiol complexes have been found to be useful as metal passivation agents.

DETAILED DESCRIPTION OF THE INVENTION

The antimony compound useful in accordance with this invention for passivating metals on cracking catalyst, can be either one or a mixture of different antimony compounds of the general formula below:

$$Sb[SR(OH)_n]_3$$

where each R is hydrocarbyl containing not more than 18 carbon atoms and can be an alkyl, alkenyl, cycloalkyl, cycloalkenyl or aryl radical or a combination of radicals or a combination of radicals such as alkaryl, aralkyl, alkenylaryl and the like; and n can be 1 to 3 with the hydroxyl groups attached to any of the carbon atoms. Examples of such compounds are antimony tris(2-hydroxyethylthiolate), antimony tris(2-hydroxypropylthiolate), antimony tris(2,3-dihydroxypropyl-1-thiolate), antimony tris(2-hydroxybenzenthiolate).

The compound of the instant invention is prepared by reacting antimony oxide and the hydroxyhydrocarbylthiol at an elevated temperature. This temperature can range from 20° to about 200° C., preferably around 100° C. The resulting clear liquid antimony hydroxyhydrocarbylthiol complex can then be used in the instant invention.

The amount of antimony compound employed in accordance with this invention can be varied in reasonable ranges. The range for the amount of antimony compound employed is relative to the amount of cracking catalyst to be treated. Any amount sufficient to passivate contaminating metals can be employed. It is presently preferred to use the antimony compound at an amount of less than about 8 weight percent antimony, based on the weight of the cracking catalyst and generally in the range of from about 0.02 to about 2 weight percent antimony, based on the weight of the cracking catalyst.

The cracking catalyst can be contacted with the antimony compound in various ways. One way is to impregnate the cracking catalyst with a solution of the antimony compound in a solvent such as 2-hydroxyethylthiol. In another embodiment the antimony compound either near or in a solvent is metered to the feed oil of the catalytic cracker upstream of the feed pump. This procedure effects thorough dilution and mixing of the feed oil with the antimony compound and avoids lay downs of this antimony compound on, for example, the heat exchanger walls.

The antimony compound if added to the hydrocarbon feed stock is added at a rate to maintain the concentration of antimony in or on the catalyst generally within the range of 0.001 to about 8, and preferably in the range of about 0.02 to about 2 weight percent based on the weight of cracking catalyst. The amount of antimony compounds actually employed depends on antimony compound desired to be deposited on the cracking catalyst and the rate of catalyst withdrawal and addition. Once the desired level of the antimony compound on the cracking catalyst has been reached, only a small amount of the antimony compound is necessary in the feed stocks to maintain the desired level of this compound on the catalyst at equilibrium conditions.

The feed stocks used for cracking processes are conventional hydrocarbon feed stocks, namely petroleum, fuel oil, shale oil, gas oil, topped crudes, etc. The cracking step of the catalytic cracking process is carried out at elevated temperatures of about 427° to about 649° C. and pressures in the range from atmospheric pressure up to 200 atmospheres.

The catalyst used for the cracking step is a conventional cracking catalyst. These catalysts generally contain silica or silica-alumina. Such materials are frequently associated with zeolitic materials. These zeolitic materials can be naturally occurring, or they can be produced by conventional ion exchange methods such as to provide metallic ions which improve the activity of the catalyst. Zeolite-modified silica-alumina catalysts are particularly applicable in this invention.

Examples of cracking catalysts into or onto which antimony can be incorporated include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ion capable of conversion to a hydrogen ion. The unused catalytic cracking material employed will generally be in particulate form having a particle size principally within the range of about 10 to about 200 microns.

In order to facilitate the handling of viscous liquid antimony hydroxyhydrocarbylthiolates, solvents can be employed to dilute these compounds. For example, excess hydroxyhydrocarbylthiols, used in the preparation of the antimony hydroxyhydrocarbylthiolates or even crude by-products such as dimers, for example, thiodiglycol, or higher homologs resulting from the manufacture of hydroxyhydrocarbylthiol can be used as diluents.

These antimony compounds resist dilution by other solvents unless the antimony compounds are already diluted with hydroxyhydrocarbylthiol. When at least 20 weight percent thiol is present, then polar solvents such as ethylene glycol, dimethylformamide, dimethylacetamide, tetrahydrofuran, and ethylene glycol monobutyl ether, 2-propanol, and water can be used.

In addition to the antimony compounds disclosed here compounds containing elements selected from groups IVA, VA and VIA of the periodic table can be employed to passivate contaminant metals on cracking catalysts.

Other uses for this antimony compound include as a hydraulic fluid additive or as a fire retardant for plastics.

The invention will be more fully understood from the following examples, which constitute preferred embodiments of this invention. They are, however, not intended to limit the scope thereof.

EXAMPLE I

This Example discloses the preparation of antimony tris(2-hydroxyethylthiolate). This compound was prepared by the stoichiometric reaction between antimony oxide, $Sb_2O_3$, and 2-mercaptoethanol, also called 2-hydroxyethylthiol, $HSCH_2CH_2OH$.

A 1 L stirred round-bottom flask was charged with 291.5 g (1.00 mole) $Sb_2O_3$ and 470 g (6.00 mole) $HSCH_2CH_2OH$, under a stream of nitrogen gas. An exothermic reaction occurred as the temperature of the mixture rose to 80° C. A mantel heater was used to raise and maintain the temperature at about 110° C. for about 2 hours. The reaction mixture became a viscous yellow liquid with a small amount of suspended white solid. During the reaction, 37 mL water by-product was collected in a Dean-Stark condenser trap. The reaction mixture was filtered to remove solids.

An infrared spectrum of the liquid product showed the absence of a SH stretching band around 2500 $cm^{-1}$ and the presence of a strong OH stretching band at 3450 $cm^{-1}$, consistent with antimony tris(2-hydroxyethylthiolate) structure.

In a second preparative run under the same conditions except that an excess of 2-mercaptoethanol was used to serve as a diluent, 55 mL water by-product (3 moles) was recovered. That amount of water is consistent with complete reaction of the antimony.

A third preparation of antimony tris(2-hydroxyethylthiolate) was made in an evacuated (20 mm) filter flask on a magnetic stirring hot plate. To 71.04 g (0.243 moles) $Sb_2O_3$ were added 174.4 g (2.23 moles) 2-mercaptoethanol. The temperature of the mixture was maintained between 80° and 130° C. for two hours. A small amount of solid was filtered off to produce a clear yellow liquid product. Ethylene glycol, 2-butyoxyethanol and water were found to be suitable diluents for the viscous yellow product.

EXAMPLE II

A commercial cracking catalyst that had been used in a commercial fluid catalytic cracker until it had attained equilibrium composition with respect to metals accumulation (catalyst was being removed from the process system at a constant rate) was used to demonstrate passivation with antimony tris(2-hydroxyethylthiolate). The catalyst, being a synthetic zeolite combined with amorphous silica/alumina (clay), was predominately silica and alumina. Concentrations of other elements together with pertinent physical properties are shown in Table I.

TABLE I

| | |
|---|---|
| Surface area $m^2g^{-1}$ | 75.9 |
| Pore Vol., $mLg^{-1}$ | 0.36 |
| Composition, wt. % | |
| Nickel | 0.38 |
| Vanadium | 0.58 |
| Iron | 0.85 |
| Alumina | 23.4 |
| Silica | 22.8 |
| Sodium | 0.46 |
| Cesium | 0.39 |

Catalyst A was prepared by diluting antimony tris(2-hydroxyethylthiolate) and excess 2-hydroxyethylthiol with 2-propanol and adding it to 40 g of equilibrium cracking catalyst. Solvent was removed by heating, with stirring, on a hot plate at about 260° C. This treatment added 0.5 wt.% antimony to the catalyst.

Catalyst B was prepared by adding antimony tris-(O,O-di-n-propylphosphorodithioate) to 40 g of equilibrium cracking catalyst. Dry cyclohexane was added to dissolve the antimony compound and facilitate its distribution over the catalyst. After stirring, the mixture was heated to about 260° C. until the solvent was evaporated. This catalyst contained 0.5 wt.% antimony.

Each catalyst was then prepared for testing by aging it. The catalyst in a quartz reactor was fluidized with nitrogen while being heated to 482° C., then it was fluidized with hydrogen while the temperature was raised from 482° to 649° C. Maintaining that temperature, fluidization continued for 5 minutes with nitrogen, and for 15 minutes with air. The catalyst was then cooled to about 482° C.; still being fluidized with air. The catalyst was then aged through 10 cycles, each cycle being conducted in the following manner. The catalyst at about 482° C. was fluidized with nitrogen for 1 minute, and heated to 510° C. during 2 minutes while fluidized with hydrogen, then maintained at 510° C. for 1 minute while fluidized with nitrogen, then heated to about 649° C. for 10 minutes while fluidized with air, and then cooled to about 482° C. during 0.5 minutes while fluidized with air. After 10 such cycles it was cooled to room temperature while being fluidized with nitrogen.

The equilibrium catalyst and catalysts A and B were evaluated in a fluidized bed reactor using heavy oil as feedstock to the cracking step. A cracking reaction was carried out at 510° C. at atmospheric pressure for 0.5 minutes and the regeneration step was conducted at about 649° C. and atmospheric pressure for about 30 minutes using fluidizing air, the reactor being purged with nitrogen before and after each cracking step.

Properties of a heavy crude used in the cracking steps are summarized in Table II.

TABLE II

| API Gravity at 15.6% C | 18.2 |
|---|---|
| Distillation (ASTM D 1160-61) | |
| 5% | 729° F. |
| 50% | 991° F. |
| Conradson Carbon | 5.71 wt. % |
| Analysis for some elements | |
| Hydrogen | 12.1 wt. % |
| Carbon | 85.9% |
| Oxygen | 0.8 wt. % |
| Sulfur | 0.45 wt. % |
| Nitrogen | 0.15% |
| Nickel | 8.05 ppm |
| Vanadium | 15.7 ppm |
| Copper | 2.8 ppm |
| Iron | 4.3 ppm |
| Sodium | 10.9 ppm |

Results of the tests using the equilibrium catalyst and catalysts A and B are summarized in Table III.

TABLE III

| Catalyst | Catalyst:Oil Wt. Ratio | Conversion Vol. % of Feed | Yields Gasoline Vol. % of Feed | SCF $H_2$/bbl Feed converted | Coke wt % Of Feed |
|---|---|---|---|---|---|
| equilibrium | 7.1 | 77.9 | 56.0 | 792 | 15.6 |
| A | 7.1 | 78.1 | 58.6 | 476 | 13.3 |
| B | 7.1 | 76.0 | 58.4 | 456 | 12.9 |

I claim:

1. A process for modifying an active hydrocarbon cracking catalyst comprising contacting said catalyst with an antimony hydroxyhydrocarbylthiolate in an amount sufficient to passivate contaminating metals.

2. A process according to claim 1 where said antimony hydroxyhydrocarbylthiolate is selected from at least one of the formula;

$$Sb[SR(OH)_n]_3$$

where the R group is a hydrocarbyl having from about 1 to about 18 carbon atoms and n is 1, 2 or 3.

3. A process according to claim 1 where said antimony is present from about 0.0001 to about 8 weight percent, based on the weight of said cracking catalyst.

4. A process according to claim 3 where said antimony is present from about 0.02 to about 2 weight percent, based on the weight of said cracking catalyst.

5. A process according to claim 1 wherein said contaminating metal is at least one of vanadium, iron and nickel.

6. A process according to claim 1 where said antimony compound is antimony tris(2-hydroxyethylthiolate).

7. A process according to claim 1 where said active cracking catalyst is a synthetic zeolite catalyst.

8. A process according to claim 1 wherein said antimony hydroxyhydrocarbylthiolate is impregnated into said cracking catalyst with a solvent.

9. A process according to claim 8 where said solvent is chosen from hydroxyhydrocarbylthiols, thiodiglycol, or other dimers or higher homologs.

10. A process according to claim 9 where other solvents chosen from ethylene glycol, dimethylformamide, dimethylacetamide, tetrahydrofuran, ethylene glycol monobutyl ether, 2-propanol, and water are also present.

11. A catalyst composition comprising an active hydrocarbon cracking catalyst treated with an antimony compound selected from at least one of the formula;

$$Sb[SR(OH)_n]_3$$

where the R group is a hydrocarbyl having from about 1 to about 18 carbon atoms and n is 1, 2 or 3.

12. A catalyst composition of claim 11 where said antimony compound is antimony tris(2-hydroxyethylthiolate).

13. A catalyst composition of claim 11 where said active hydrocarbon cracking catalyst is a synthetic zeolite catalyst.

14. A catalyst composition according to claim 11 where said antimony is present from about 0.0001 to about 8 weight percent, based on the weight of said cracking catalyst.

15. A catalyst composition according to claim 14 where said antimony is present from about 0.02 to about 2 weight percent based on the weight of said cracking catalyst.

16. A catalyst coposition according to claim 11 wherein said antimony hydroxyhydrocarbylthiolate is impregnated into said cracking catalyst with a solvent.

17. A catalyst composition according to claim 16 where said solvent is chosen from hydroxyhydrocarbylthiols, thiodiglycol, or other dimers or higher homologs.

18. A catalyst composition according to claim 17 where other solvents chosen from ethylene glycol, dimethylformamide, dimethylacetamide, tetrahydrofuran, ethylene glycol monobutyl ether, 2-propanol, and water are also present.

* * * * *